United States Patent [19]

Hynes

[11] Patent Number: 4,706,999
[45] Date of Patent: Nov. 17, 1987

[54] FLEXIBLE, RESILIENT SADDLE FOR SWINGJOINT

[76] Inventor: Maurice A. Hynes, 2775 SW. 46th Ave., Ft. Lauderdale, Fla. 33314

[21] Appl. No.: 812,754

[22] Filed: Dec. 23, 1985

[51] Int. Cl.$^4$ .............................................. F16L 5/02
[52] U.S. Cl. .................................... 285/196; 285/197; 285/275; 29/450; 16/2
[58] Field of Search ............... 285/196, 338, 162, 197, 285/275; 16/2; 29/450, 451; 277/178, 215

[56] References Cited

U.S. PATENT DOCUMENTS

| | | | |
|---|---|---|---|
| 2,039,009 | 4/1938 | Lampman et al. | 285/192 X |
| 2,897,533 | 8/1959 | Bull et al. | 16/2 |
| 3,819,118 | 6/1974 | Brock | 285/162 X |
| 3,831,985 | 8/1974 | Oostenbrink | 285/162 |

FOREIGN PATENT DOCUMENTS 40822  3/1977  Japan ................... 285/162

Primary Examiner—Dave W. Arola
Attorney, Agent, or Firm—Melvin K. Silverman

[57] ABSTRACT

Disclosed is a flexible resilient saddle for effecting a fluid path between a primary channel and a secondary channel, the secondary channel oriented normally to the flow axis of the primary channel, the flow path passing thru an aperture in the primary channel. The inventive saddle includes a longitudinal drum-like bore having a hollow internal surface, the bore having an inner end for interfacing with the primary channel and an outer end opposite thereto for interfacing with an extension of the secondary channel. Further included is an inner peripheral collar extending integrally normally outwardly from an outer area of the inner end of the bore, the inner collar permitting press-fitable, fluid-tight insertion into the aperture and, thereby, into the primary channel. Yet further included is an outer peripheral collar extending integrally normally outwardly from an outer surface proximate to the outer end of the drum-like bore, the outer collar axially separated from the inner collar by a dimension generally corresponding to the wall thickness of the primary channel, the collars having respective opposing facing surfaces for fluid-tight resilient engagement with the inner and outer walls of the primary channel about the aperture. Therein, a fluid-tight fluid path between the primary channel and the secondary channel is achieved through the press-fitable insertion of the inner collar into the aperture of the primary channel.

14 Claims, 5 Drawing Figures

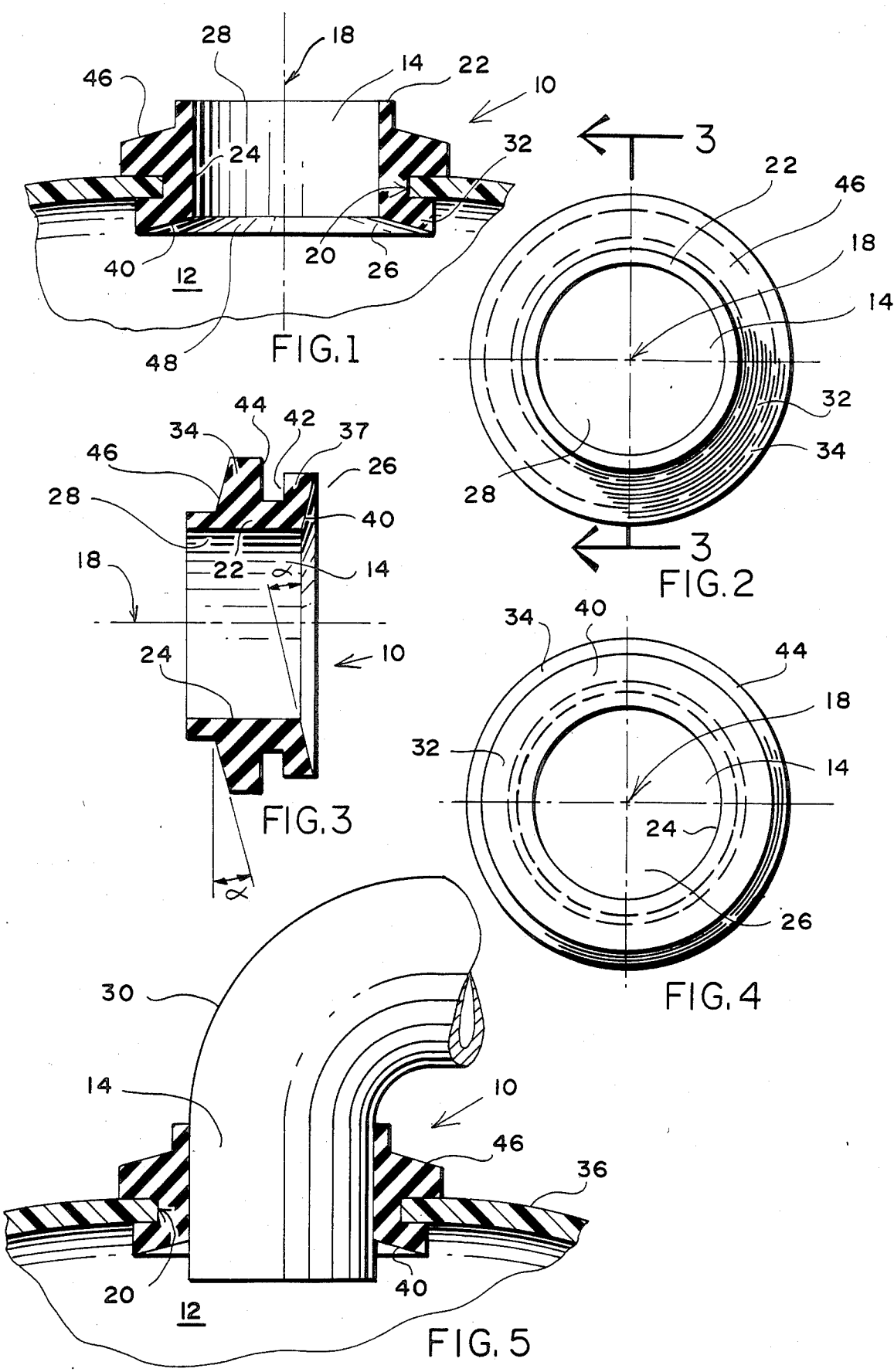

FLEXIBLE, RESILIENT SADDLE FOR SWINGJOINT

BACKGROUND OF THE INVENTION

The invention pertains generally to an adapter means for providing a fluid-tight, swing-fitable interface between a primary and a secondary fluid flow channel. Such adapter means are useful in furnishing a series of individual well point risers from a common pipe header that, in turn, is connected to pumping means.

The various elements of a well point pumping assembly render necessary the capability to quickly provide secondary channels (the well point risers) off of a primary channel (the common pipe header) in which the axes of the secondary channels can be rotated relative to the axis of the primary channel.

The prior art, as best known to the inventor, is reflected in U.S. Pat. No. 4,261,601 (1981) to Sloan.

Other patents generally related to the present subject area include U.S. Pat. Nos. 4,029,438 and 4,207,921 to Sloan; and 3,566,982 to Share.

SUMMARY OF THE INVENTION

The invention more particularly relates to a flexible resilient saddle for effecting a fluid path between a primary channel and a secondary channel, said secondary channel oriented normally to the flow axis of said primary channel, said flow path passing thru an aperture in said primary channel. The inventive saddle comprises a longitudinal drum-like bore having a hollow internal surface corresponding to said secondary channel, said bore having an inner end for interfacing with said primary channel and an outer end opposite thereto for interfacing with extension means of said secondary channel. Further included is an inner peripheral collar depending integrally normally outwardly from an outer area of said inner end of said bore, said inner collar comprising means for press-fitable, fluid-tight insertion into said aperture and, thereby, into said primary channel. The inventive saddle yet further comprises an outer peripheral collar depending integrally normally outwardly from an outer surface proximate to said outer end of said drum-like bore, said outer collar axially separated from said inner collar by a dimension generally corresponding to the wall thickness of said primary channel, said collars having respective opposing facing surfaces for fluid-tight resilient engagement with the inner and outer walls of said primary channel about said aperture. Thereby, a fluid-tight fluid path between said primary channel and said secondary channel is achieved through said press-fitable insertion of said inner collar into said aperture of said primary channel.

It is accordingly an object of the present invention to provide an adapter means for selectively providing secondary fluid flow channels, from a primary channel.

It is another object to provide a flexible resilient saddle to serve as said adapter means, said saddle being suitable for quick insertion into a wall of the primary channel after appropriate apertures have been formed therein.

It is a yet further object to provide a resilient saddle of the above type suitable for interfacing with an extension means, each means defining a said secondary channel.

It is a still further object of the invention to furnish an improved means for the formation of a self-sealing, swing joint at an interface between a primary and secondary channel.

It is a yet further object to provide a means of the above type having particular utility in well point pumping apparatus.

The above and yet further objects and advantages of the present invention will become apparent during the hereinafter set forth Detailed Description of the Invention, the Drawings and Claims appended herewith.

BRIEF DESCRIPTION OF THE DRAWINGS

FIG. 1 is a cross-sectional elevational view showing the present inventive flexible saddle, after insertion into a primary channel.

FIG. 2 is an outer plan view of the inventive flexible saddle.

FIG. 3 is an axial cross-sectional view taken along Line 3—3 of the FIG. 2.

FIG. 4 is an inner plan view of the flexible saddle.

FIG. 5 is a cross-sectional elevational view, similar to FIG. 1, however, showing a rotatable extension inserted into the saddle.

DETAILED DESCRIPTION OF THE INVENTION

With reference to FIG. 1 there is illustrated, in conceptual view, the present inventive saddle 10 positioned with reference to a primary channel 12 and a secondary channel 14. Therein, the flow axis of primary channel 12 is illustrated at point 16 in FIG. 1, while the flow axis of secondary channel 14 is illustrated by center line 18 in FIG. 1.

As noted in the Summary of the Invention, the present inventive flexible saddle operates to accomplish two purposes; firstly, the effectuation of a fluid path between said primary channel 12 and secondary channel 14 and, secondly, the formation of a self-sealing, swing joint, such a joint being a part of the flow path from the primary to secondary channel. (See FIG. 5.)

As shown in FIGS. 1 and 5, the secondary channel 14 is oriented normally to the flow axis 16 of the primary channel 12. Further, the flow axis 18 of the secondary channel originates at aperture 20 which is formed within a wall 36 of the primary channel 12.

With reference to FIGS. 2 thru 4, it may be seen that the flexible saddle includes a longitudinal drum-like bore 22 having an internal surface 24 corresponding in diametric dimension to said secondary channel 14. Said bore 22 exhibits an inner end 26 for interfacing with said primary channel 12 and an outer end 28, axially opposite to said inner end, for interfacing with extension means 30 which, as indicated in FIG. 5, is adapted for rotatable press-fit insertion into internal surface 24 of bore 22.

The inventive saddle 10 further includes an inner peripheral collar 32 (see FIG. 3) depending integrally and substantially normally outwardly from a radially outer area of said inner end 26 of said bore 22. Said inner collar 32, by virtue of both its geometry and resilient material, is adapted for press-fitable fluid-tight insertion into said aperture 20 of said primary channel 12. In a preferred embodiment, the saddle is formed of a durable, resilient, compressible material such as Polybutadiene synthetic rubber, commonly known as BUNA N rubber.

The flexible saddle yet further includes an outer peripheral collar 34 also depending integrally and normally outwardly from a radially outer area proximate to said outer end 28 of bore 22.

In FIG. 3, it may be seen that outer collar 34 is axially displaced from inner collar 32 by a dimension 38 which generally corresponds to the width of wall 36 (see FIG. 1) of the primary channel 12. By reason of respective opposing facing surfaces 42 and 44 of collars 32 and 34 respectively, a fluid-tight resilient engagement with the inner and outer sides of wall 36 of the primary channel 12, about aperture 20, is assured. As above noted, the particular choice of geometry and materials of saddle 10 produces the advantageous properties of the saddle by which the objects of the invention are achieved. More particularly, a fluid-tight fluid path between the primary channel 12 and the secondary channel 14 is achieved through the straightforward press-fitable insertion of the inner collar 32 into the aperture 20 of primary channel 12. This, for example, may be readily accomplished through the use of any flat ended instrument such as a screw driver.

In a preferred embodiment, the primary and secondary channels are circular in their internal cross-section as, similarly, is the cross-section of the longitudinal bore 22. In most fluid-transfer situations, circular cross-section piping is utilized. This preferred geometry of the inventive saddle, reflecting the conventional usage of circular cross-section piping, is shown in the figures in which, it may be seen that longitudinal bore 22 comprises a hollow cylindrical structure defined by at least one radially-disposed solid of rotation wherein the inner-most radii thereof defines the radius of the secondary channel 14. Also, the inner collar 32 comprises an inner solid annulus 50 (see FIG. 4) depending radially outwardly from said bore 22, said solid annulus defined by a first solid of rotation rotated about a radius defined by said aperture 20 of the primary channel 12. Similarly, the outer collar 34 comprises an outer solid annulus 52 (see FIG. 2) depending radially outwardly from the bore 22 in which, as may be seen in FIGS. 2 and 3, said outer annulus 52 is defined by a second solid of rotation which is larger in rotational cross-section than is said first solid. The outer solid annulus 52 is also rotated about the radius which defines aperture 20 of the primary channel 12.

With further reference to FIG. 3, it may be seen that inner radial surface 40 of said inner collar 32 is substantially parallel to outer radial surface 46 of outer collar 34. This relationship may also be seen in FIG. 1. In operation, it is intended that said surfaces 40 and 46 will be substantially co-parallel with the curvature of wall 36 after insertion of said first collar 32 into primary channel 12 has been accomplished. In FIG. 3, the angulation of said surfaces 40 and 46 relative to the the plane of the cross-section of axis 18 may be seen. In a preferred embodiment, the angle $\alpha$ is 15 degrees.

With further reference to FIG. 5, it may be noted that the inventive saddle defines a smooth inner surface 24 within longitudinal bore 22 which comprises a means for receiving and frictionally securing, in a single degree of rotational freedom, extension means 30. Thereby, extension means 30 may, as desired, be rotated within the present inventive flexible saddle without detriment to the integrity of the saddle. The inherent durability of the BUNA-N rubber contributes to this characteristic of the saddle.

With further respect to the properties of materials suitable for use in the inventive saddle, it has been determined that the co-efficient of sliding friction of the internal surface 24 relative to extension means 30 is in a medium range; that the 300% modulus of the polybutadiene is in the range of 1,000 to 2,000 psi; that the tensile strength of the material is in the range of 1,500 to 3,000 psi; that the elongation at break is in the range of 350 to 600%; and that the rebound is in the range of 55 to 80%.

As a result of the above set forth geometry and material properties of the saddle, radial fluid pressure within said primary and secondary channels will urge the annular collars 32 and 34, and longitudinal bore 22, into resilient fluid-tight communication with the inner and outer sides of wall 36 of the primary channel 12 and about aperture 20, this occurring at interface 48 (see FIG. 1) between the channels.

The present invention may be additionally viewed in terms of a method encompassing the steps of creating an aperture in the wall of the primary channel substantially equal to the diameter of a secondary channel to be formed. Thereafter, the flexible inner collar 32 of the saddle is pressed inside of aperture 20 and, thereby, against the internal wall of the primary channel 12. Thereafter, outer collar 34 of the saddle is positioned against the outside of aperture 20 and against the outside of wall 36 of primary channel 12. Thereafter, the extension means 30 having substantially the same diameter as secondary channel 14, is (as shown in FIG. 5) press-fitably inserted into the saddle such that rotation of the extension means about a single rotational degree of freedom can be accomplished.

It may be noted that the outer collar 34 is of greater dimension and, thereby, of greater mass than inner collar 32 to, thereby, provide suitable support for the added mass of extension means 32 after insertion thereof has occurred.

While there have been herein shown and described the preferred embodiments of the present invention, it is to be understood that the invention may be embodied otherwise than as herein illustrated and described and that within said embodiments certain changes in the detail and construction, and the form and arrangement of the parts, may be made without departing from the underlying ideas or principles of this invention, within the scope of the appended claims.

Having thus described my invention, what I claim as new, useful, and non-obvious and, accordingly, secure by Letters Patent of the United States is:

1. A flexible resilient saddle for effecting a a fluid path for a swingjoint between a primary channel and a secondary channel, said secondary channel oriented normally to the flow axis of said primary channel, said flow path passing thru an aperture in said primary channel, the saddle comprising:

(a) a longitudinal drum-like bore having a hollow internal surface corresponding to said secondary channel, said bore having an inner end for interfacing with said primary channel and an outer end opposite thereto for interfacing with swingjoint extension means of said secondary channel, said longitudinal bore further comprising a hollow cylindrical structure defined by at least one radially disposed solid of rotation, the inner most radii thereof defining the radius of said secondary channel:

(b) an inner peripheral collar depending integrally normally outwardly from a radially outer area of said inner end of said bore, said inner collar comprising means for pressfittable, fluid tight insertion into said aperture and, thereby, into said primary channel, said inner peripheral collar further comprising an inner solid annulus depending radially outwardly from said bore, said solid annulus defined by a first solid of rotation, rotated about a radius defined by said aperture within said primary channel, said inner collar having an inner radial surface extending into said primary channel, said inner surface defining an angle of about 15° with reference to the plane of said aperture in said primary channel, said aperture defining the fluid interface between primary and secondary channels, said angle radiating away from said aperture plane in the direction of said primary channel such that the greatest thickness of said inner collar is at its outer circumference; and (c) an outer peripheral collar depending integrally normally outwardly from an outer surface proximate to said outer end of said drum-like bore, said outer collar axially separated from said inner collar by a dimension generally coresponding to the wall thickness of said primary channel, said collars having respective opposing facing surfaces for fluid tight resilient engagement with the inner and outer walls of said primary channel about said aperture, said outer peripheral collar further comprising an outer solid annulus, having an outer surface depending radially outwardly from said bore, said outer annulus defined by a second solid of rotation, larger in rotational cross-section than said first solid, said second solid of rotation also rotated about said aperture-defined radius, of said primary channel whereby a fluid tight path between said primary channel and said secondary channel is achieved through said press-fitable insertion of said inner collar into said aperture of said primary channel and, further whereby, radial fluid pressures within said primary and secondary channels will urge said annular collars and said longitudinal bore into resilient fluid tight communication with said inner and outer walls of said primary channel and about said aperture at the interface between said primary and secondary channels.

2. The saddle as recited in claim 1 in which said outer surface of said outer collar defines an angle of about 15° with reference to the plane of said bore of said secondary channel.

3. The flexible resilient saddle as recited in claim 1 in which said primary and secondary channels define circular internal cross-sections.

4. The flexible resilient saddle as recited in claim 1 in which an inner radial surface of said inner collar is substantially parallel to an outer radial surface of said outer collar.

5. The flexible resilient saddle as recited in claim 1 in which both said inner surface of said inner collar and said outer surface of said outer collar are substantially co-parallel with the curvature of the walls of said primary channel after insertion of said first collar has been accomplished.

6. The flexible resilient saddle as recited in claim 1 in which the internal diameter of said longitudinal bore defines a smooth cylindrical surface comprising means for receiving and frictionally securing, in a single degree of rotational freedom, a pipe comprising said extension means.

7. The flexible resilient saddle as recited in claim 1 in which said saddle comprises a material having a rebound in the range of 55 to 80%.

8. The flexible resilient saddle as recited in claim 7 in which said saddle comprises a material having a 300% modulus in the range of 1,000 to 3,000 psi.

9. The flexible resilient saddle as recited in claim 7 in which said saddle comprises a material having a tensile strength in the range of 1,500 to 3,000 psi.

10. The flexible resilient saddle as recited in claim 7 in which said saddle comprises a material having an elongation at break in the range of 350 to 600 psi.

11. The flexible resilient saddle as recited in claim 7 in which said saddle comprises rubber.

12. The flexible resilient saddle as recited in claim 11 in which said rubber comprises a polybutadiene rubber.

13. A method of using a resilient saddle having a longitudinal axis and axially spaced inner and outer annular lips to form a cylindrical secondary, swingjoint channel along the longitudinal axis of said saddle, and normally relative to a cylindrical primary channel, having a wall with inner and outer surfaces the method comprising the steps of:

(a) creating an aperture in the wall of said primary channel substantially equal to the diameter of the secondary channel to be formed;

(b) press-fitting the flexible inner annular lip of said saddle inside of said aperture and against the internal surface of said primary channel, said inner annular lip having an inner radial surface extending into said primary channel, said inner surface defining an angle of about 15° with reference to the plane of said aperture in said primary channel, said aperture defining the fluid interface between primary and secondary channels, said angle radiating away from said aperture plane in the direction of said primary channel such that the greatest thickness of said inner collar is at its outer circumference;

(c) positioning the flexible outer annular lip of the saddle outside of said aperture and against the outer surface of said primary channel; and (d) providing said saddle with a uniform hollow cylindrical internal diameter, communicating to said primary channel, for press-fittably receiving an extension means thereto comprising said secondary channel.

14. The method of using a resilient saddle as recited in claim 13, further comprising the step of:

forming said outer annular lip to define a greater radial extent and material mass than said inner annular lip.

* * * * *